United States Patent
Haisma

[19]

[11] Patent Number: 6,105,797
[45] Date of Patent: Aug. 22, 2000

[54] ADJUSTABLE STAND ASSEMBLY FOR MOUNTING AT LEAST ONE STAND PLATFORM IN A VARIETY OF ASPECT POSITIONS

[76] Inventor: Romka Haisma, 62 Maroondah Highway, Healesville, Victoria, Australia, 3777

[21] Appl. No.: 09/254,124

[22] PCT Filed: Mar. 5, 1997

[86] PCT No.: PCT/AU97/00131

§ 371 Date: Mar. 1, 1999

§ 102(e) Date: Mar. 1, 1999

[87] PCT Pub. No.: WO98/09556

PCT Pub. Date: Mar. 12, 1998

[30] Foreign Application Priority Data

Sep. 2, 1996 [AU] Australia ............................ 64387/96

[51] Int. Cl.[7] ................................ A47F 3/14; B62B 1/12
[52] U.S. Cl. ..................... 211/130.1; 211/195; 280/79.3; 280/651
[58] Field of Search .................. 211/130.1, 126.6, 211/132.1, 195, 202, 149; 280/651, 654, 47.19, 47.35, 47.131, 47.24, 79.3, 639

[56] References Cited

U.S. PATENT DOCUMENTS

| | | | |
|---|---|---|---|
| 701,826 | 6/1902 | Amerman | 211/130.1 X |
| 1,358,235 | 11/1920 | Nylin | 280/651 |
| 1,387,745 | 8/1921 | Walton et al. . | |
| 1,407,912 | 2/1922 | Bates | 211/202 |
| 1,541,211 | 6/1925 | Ford | 211/130.1 X |
| 1,692,324 | 11/1928 | Averill . | |
| 1,724,385 | 8/1929 | Weston | 211/130.1 |
| 1,779,788 | 10/1930 | Weston | 211/130.1 |
| 1,956,261 | 4/1934 | Wagner | 211/130.1 |
| 1,961,394 | 6/1934 | Rothe | 211/130.1 |
| 1,964,124 | 6/1934 | Keller . | |
| 2,141,881 | 12/1938 | Schray | 280/651 |
| 2,284,801 | 6/1942 | Conger | 280/651 |
| 2,584,489 | 2/1952 | Morrison . | |
| 2,599,380 | 6/1952 | Galvin | 211/130.1 |
| 3,841,237 | 10/1974 | Plymate . | |
| 3,981,511 | 9/1976 | Foster | 211/150 |
| 4,131,205 | 12/1978 | Malecki . | |
| 4,355,818 | 10/1982 | Watts | 280/654 |
| 4,493,492 | 1/1985 | Balabanova | 280/651 |
| 5,002,293 | 3/1991 | Gottselig | 280/47.35 |
| 5,048,206 | 9/1991 | Jones | 280/651 |
| 5,192,092 | 3/1993 | DiBenedetto | 280/654 |
| 5,590,796 | 1/1997 | Herman | 211/195 X |
| 5,687,984 | 11/1997 | Samuel | 280/641 |
| 5,730,452 | 3/1998 | Fields | 280/47.35 |
| 5,810,373 | 9/1998 | Miranda | 280/47.2 |

FOREIGN PATENT DOCUMENTS

| | | |
|---|---|---|
| 658595 | 6/1929 | France . |
| 2137287 | 12/1972 | France . |
| 1561614 | 4/1970 | Germany . |
| 175191 | 7/1935 | Switzerland . |
| 188018 | 11/1922 | United Kingdom . |
| 204776 | 10/1923 | United Kingdom . |
| WO9532651 | 12/1995 | WIPO . |

*Primary Examiner*—Daniel P. Stodola
*Assistant Examiner*—Jennifer E. Novosad
*Attorney, Agent, or Firm*—Richard M. Goldberg

[57] ABSTRACT

A stand assembly includes a base to which attached rotatably, a framework for a set of stand platforms, and a location member for positioning the framework at selected angles, wherein each platform is rotatably attached to the framework in such a manner that the rotatably attached framework produces a stable level condition in each of the platforms.

8 Claims, 5 Drawing Sheets

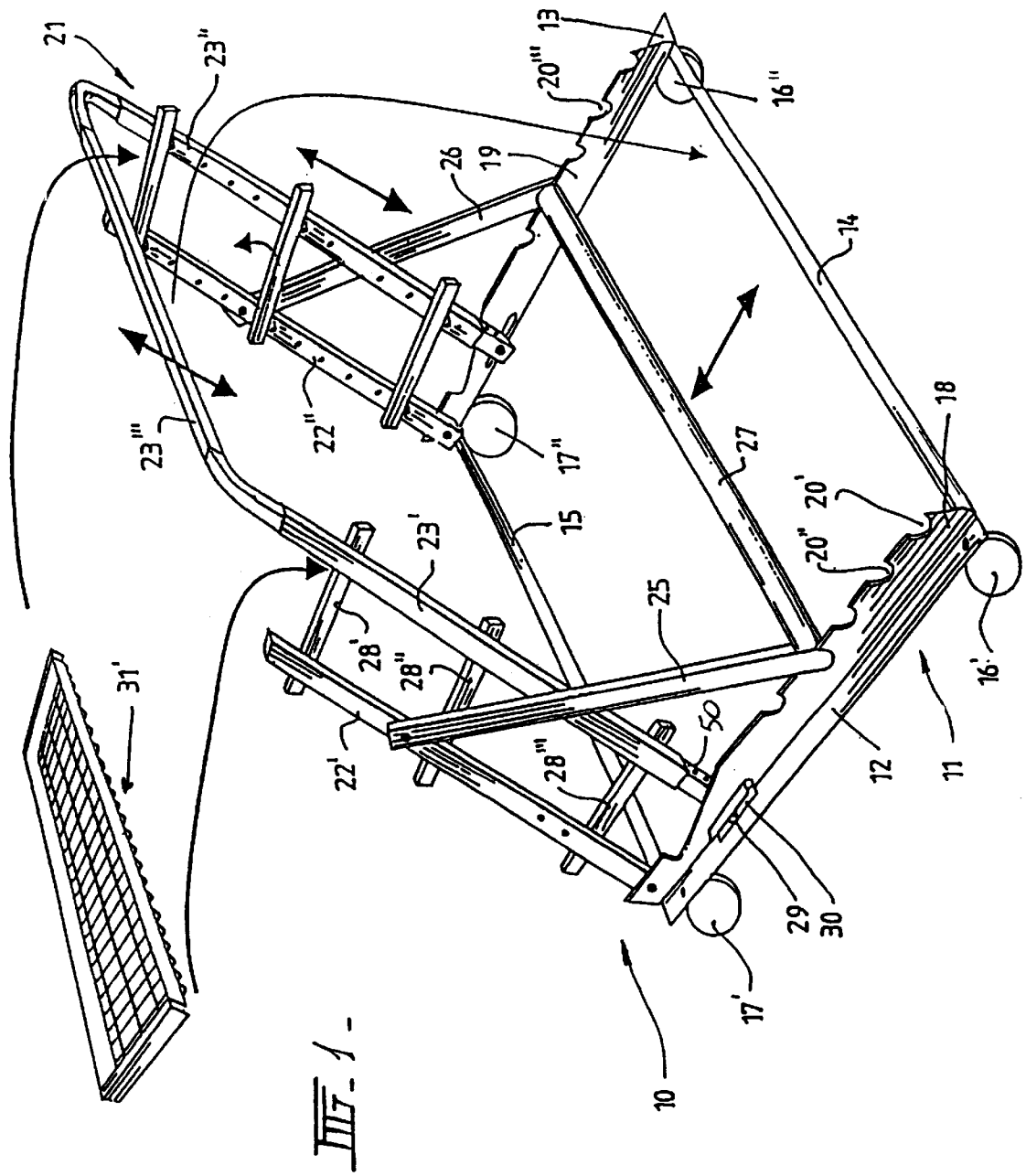

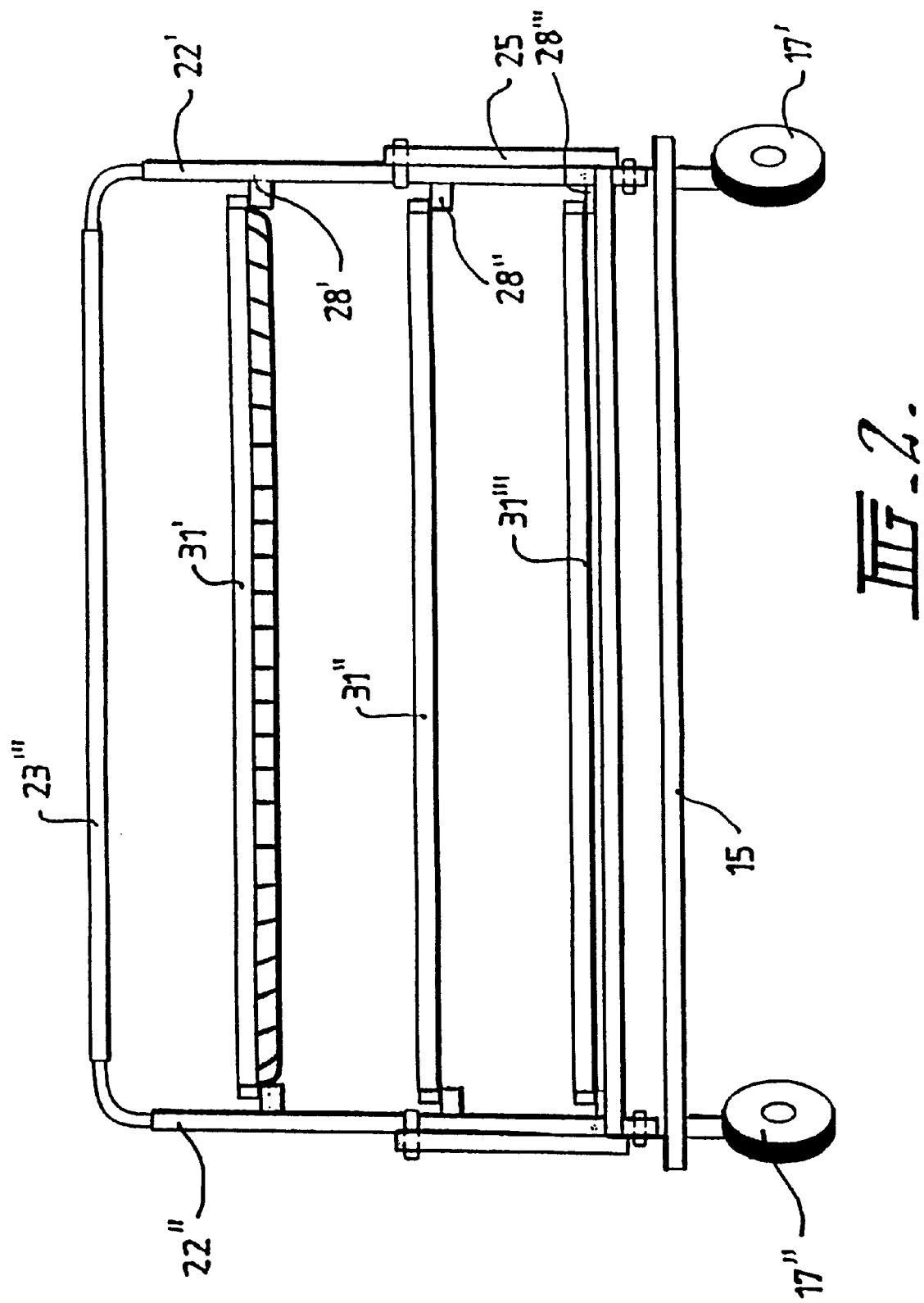

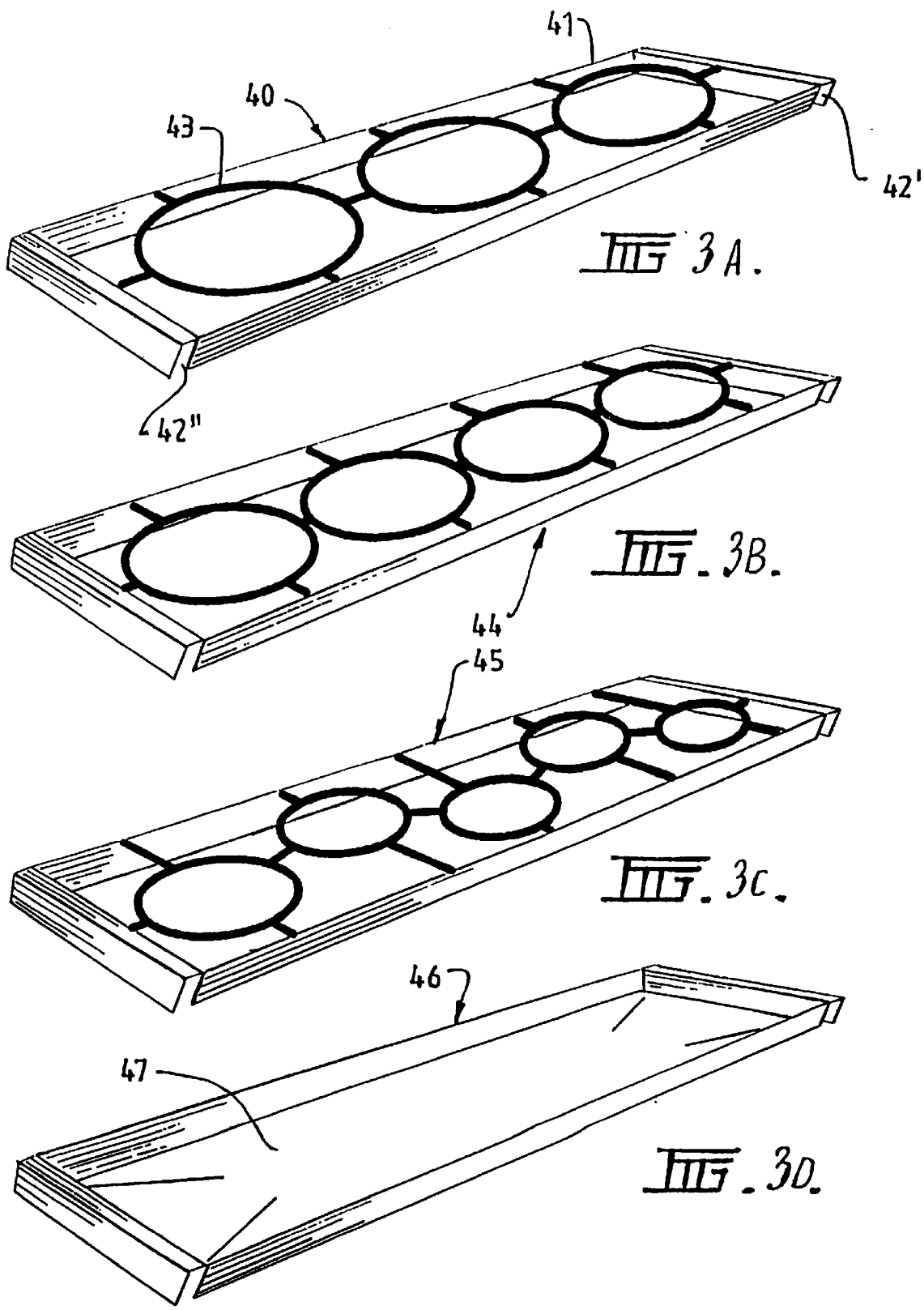

ADJUSTABLE STAND ASSEMBLY FOR MOUNTING AT LEAST ONE STAND PLATFORM IN A VARIETY OF ASPECT POSITIONS

FIELD OF THE INVENTION

This invention relates to a stand assembly and in one preferred aspect relates to a stand assembly suitable for displaying and holding trays or shelves for supporting plants, wine bottles, books, store merchandise etc.

BACKGROUND TO THE INVENTION

Numerous types of display assemblies have been proposed for merchandise. However, in the case of stands for plants, particularly display stands, the plants should be displayed in such a way that the different tiers of plants receive adequate lighting. Furthermore, it is important that the stand may be easily moved from place to place and that it can fit through narrow openings if it is necessary to move the stand around a premises or plant nursery. Thus it is preferable that the stand be foldable to ensure that its dimensions can be compressed in order to allow it to be moved through narrow apertures.

BRIEF SUMMARY OF THE INVENTION

This invention provides a stand assembly, which comprises:

(a) a base to which is attached rotatably (b) a framework for a set of stand platforms; and (c) a location member for positioning the framework at selected angles, wherein each platform is rotatably attached to the framework in such a manner that the rotatably attached framework produces a stable level condition in each of the platforms.

Accordingly, in one particularly preferred embodiment, the invention provides an adjustable stand assembly for mounting one or a plurality of stand platforms in a variety of aspect positions, said assembly including a base and an upwardly extending generally open framework for mounting said platforms wherein said base is adapted for generally horizontal placement on level ground and includes two substantially parallel spaced apart sides, said open framework includes two spaced apart side strut assemblies each strut assembly comprising a forward strut and a pair of telescopically cooperative rearward struts wherein said forward strut is pivotally engaged at or near a first end of a first side of said base and the internal rearward strut of said rearward strut pair is pivotally engaged away from said first end of said first base side wherein said forward strut and rearward external strut are bridged by one or a plurality of pivotally fixed transverse supports being adapted to engage said platform or platforms such that the telescopic adjustment of said rearward strut pair provides a coordinated adjustment of the angle of inclination of said platforms wherein said angle of inclination can be maintained substantially as the framework is pivoted relative to said base.

BRIEF DESCRIPTION OF THE DRAWINGS

One embodiment of the invention is illustrated in the accompanying drawings in which:

FIG. 1 is a perspective view from one side and to the rear of the stand assembly according to the invention;

FIG. 2 is a front view of the stand assembly shown in FIG. 1;

FIGS. 3A, 3B, 3C, 3D and 3E show differing platforms and how they it to the stand assembly.

DETAILED DESCRIPTION

Figure 3E:
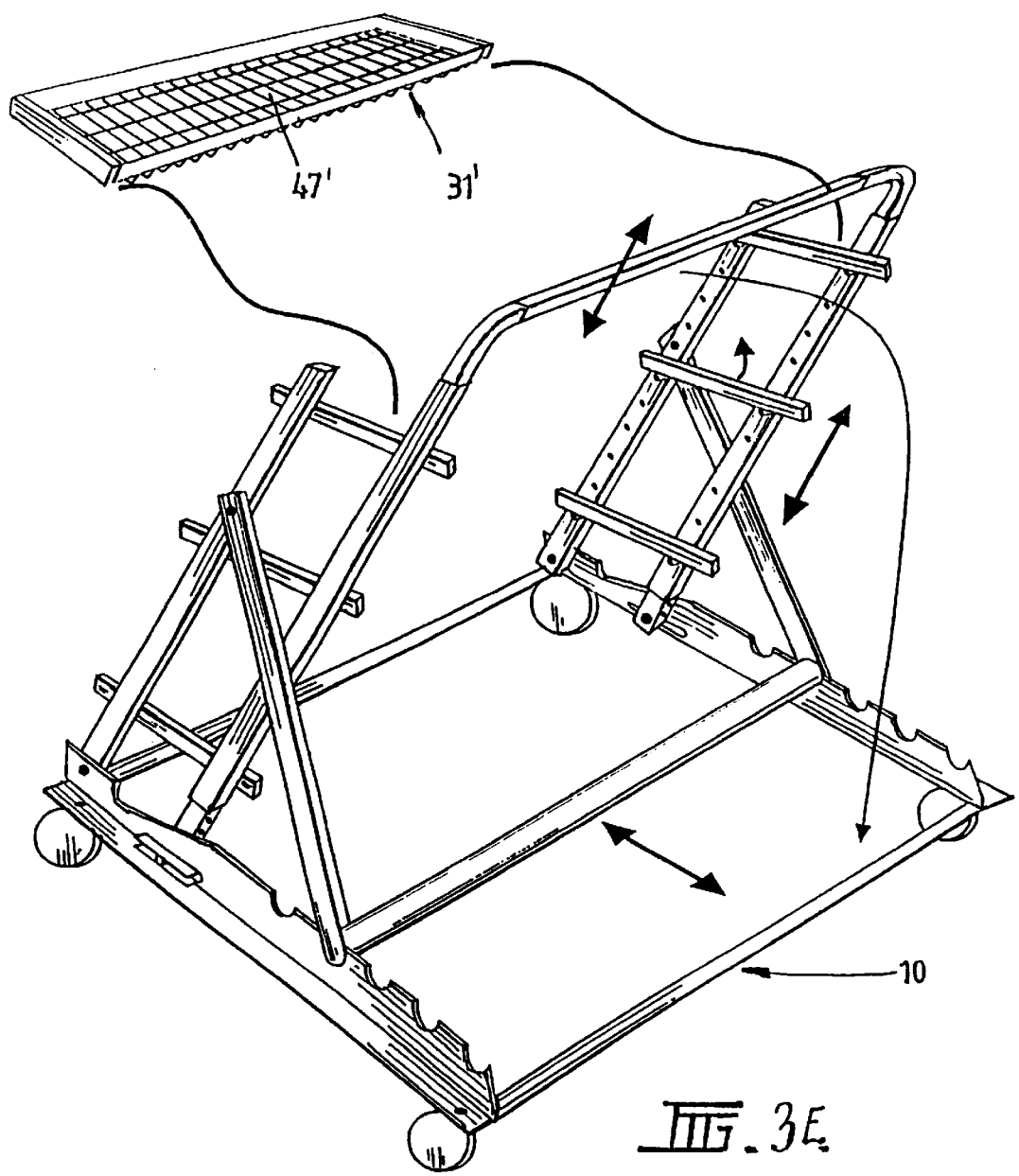

Preferably the base comprises a square or rectangular base frame, for example, a substantially flat 4-sided frame preferably supported by castors.

Preferably near one side of the base frame, for example, a longer side, is located an upwardly extending framework adapted to rotate from a substantially upright position to a substantially squat position.

The framework is preferably constructed from a frontward (as seen in use) strut and a substantially parallel rearward strut. The struts are preferably joined by a plurality of substantially parallel, substantially horizontal supports, each support being attached rotatably to its corresponding strut.

The framework is preferably supported by a prop member which preferably extends downwardly to the base frame and may be altered in a position with respect to the base frame, whereby the angular presentation of the framework may be selected.

Preferably the rotatable attachment of each rearward strut to the base frame is by means of a slot in the base frame allowing the framework sufficient slop in its movement to simplify rotation at other attachment points.

The trays may be shaped to hold objects of various shapes, for example, they may be provided with depressions to accommodate pot plants.

Two advantages of the stand assembly according to the inventor are:

Firstly it will fold substantially flat for ease of transport; and

Secondly, the tilt positions of the various shelves may be selected.

Turning to the accompanying drawings, FIGS. 1 and 2, a stand assembly 10 comprises a base frame 11, which itself comprises two side girders 12 and 13 with rear and front girders, 14 and 15 arranged in the form of a rectangle. The base frame 11 is supported by casters 16', 16", 17', 17" at each corner of the rectangle. Plates 18 and 19 extend upwardly from side girders 12 and 13 respectively. Two corresponding series of indents such as 20', 20", 20'" etc are let into the upper portions of each plate 18 and 19.

An upwardly extending framework 21 comprises two forwardly mounted (as viewed in use) struts 22' and 22" and two rearwardly mounted strut pairs 23' and 23" both rotatably attached to plates 18 and 19 respectively. Each rearward strut pair is made up of an internal strut and a telescopically mounted external strut. The struts 23' and 22' are joined by transverse (as viewed in use) supports 28', 28", 28'", as are struts 22" and 23" by other supports (unnumbered). Struts 23' and 23" are connected at their upper ends by a lateral strut 23'". A U-shaped stay 25, 26, 27 is pivotally attached to struts 22' and 22" and fits into the corresponding series of indents 20', 20", 20'" etc.

Finally, a pivot member provided with a spigot or wheel 29 is shown projecting through a slotted groove 30 in plate 18 to provide the requisite amount of movement to allow the framework to fold down.

The corresponding strut 23" is also supplied with a pivot member which fits into the corresponding plate 19.

The fixed front pivot is formed at a raised position on the base side relative to the slot 30 so to allow the frame work to completely fold flat against the base.

The rear strut pairs 23' and 23" are adjustable in length so that the angle of tilt of the platforms may be adjusted; a clip 50 is shown on strut 23". This clip is used as a locking means to maintain the strut in position. The corresponding clip on the strut 23" has not been shown. FIG. 2 shows the relationship of platforms 31', 31" and 32".

In FIGS. 3A, 3B, 3C, 3D and 3E, various types of platforms are shown. Thus, platform 40 has a generally rectangular framework 41 with slots 42' and 42" at opposite ends. Numeral 43 indicates one of a series of pot holders. Platforms 44 and 45 have different series of pot holders. Platform 46 has a flat bottom 47. Platform 31' has a mesh bottom 47'.

Figure 4A:
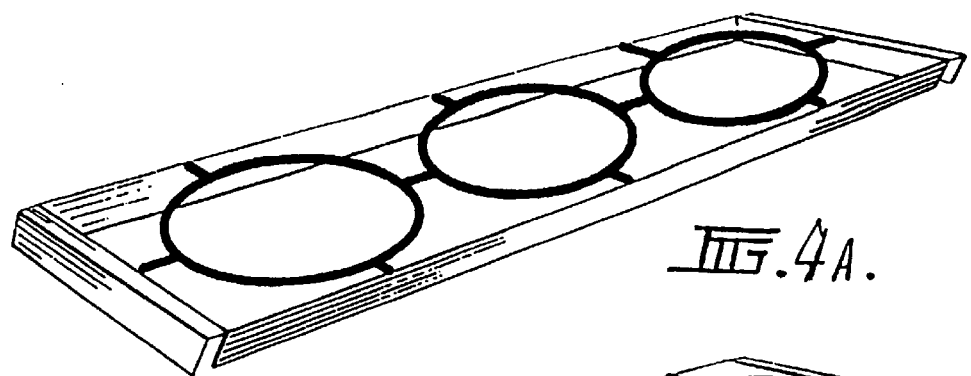
FIGS. 4A, 4B, 4C, 4D and 4E correspond to FIGS. 3A, 3B, 3C, 3D and 3E (in part).
Figure 4B:
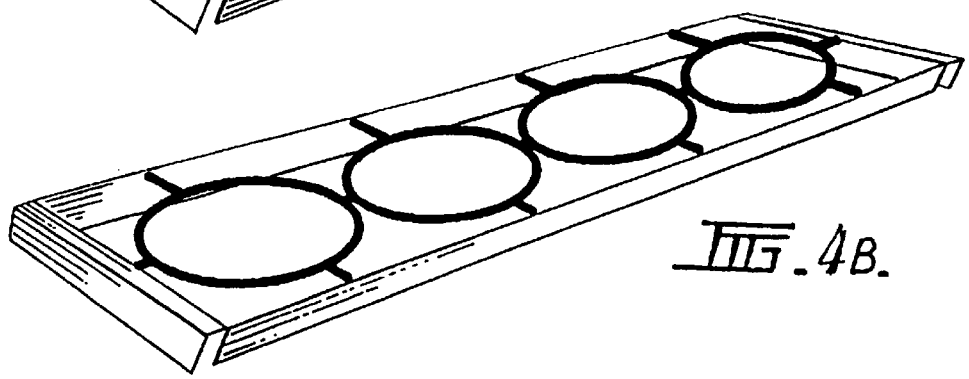
Figure 4C:
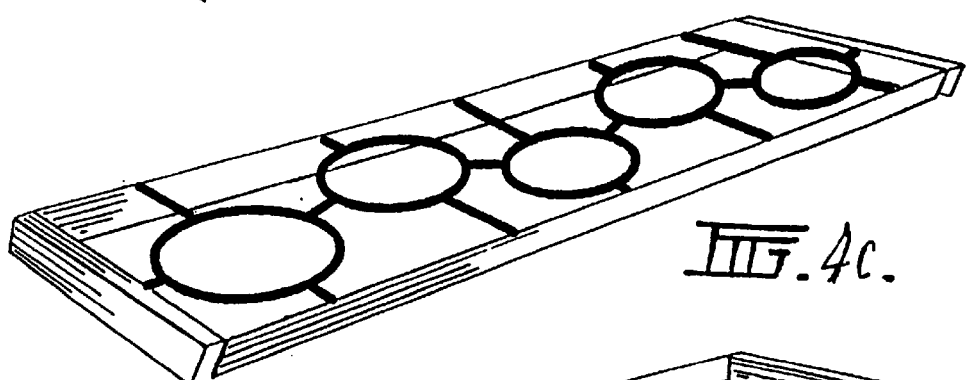
Figure 4D:
Figure 4E:
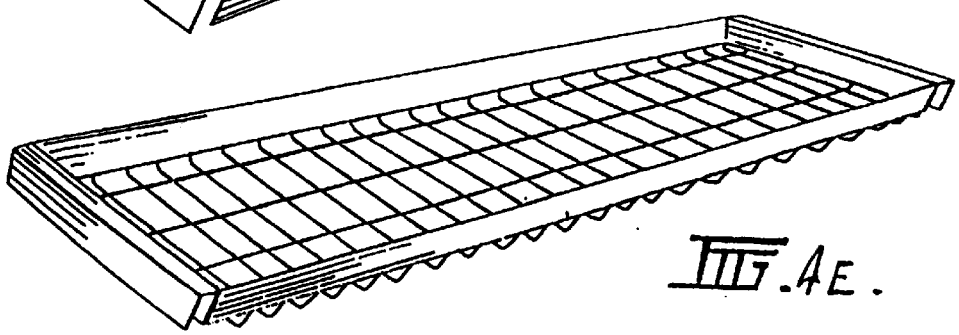

FIGS. 4A, 4B, 4C, 4D and 4E correspond to FIGS. 3A, 3B, 3C, 3D and 3E (in part).

What is claimed is:

1. An adjustable stand assembly for mounting at least one stand platform in a variety of positions, said assembly comprising:

a base adapted for generally horizontal placement on level ground and including first and second substantially parallel spaced apart side girders, each side girder including a plurality of spaced apart grooves, an upwardly extending generally open framework for mounting the at least one platform, said open framework including:

first and second spaced apart side strut assemblies, each strut assembly including a forward strut and a telescopically cooperative rearward strut defining an internal strut and external strut, said forward strut of said first strut assembly being pivotally connected to a first end of said first side girder of said base and the internal one of said rearward strut of said first strut assembly being pivotally connected to said first side girder of said base at a position spaced away from said first end of said first side girder such that the forward strut and rearward strut of the first strut assembly move parallel with each other, said forward strut of said second strut assembly being pivotally connected to a first end of said second side girder of said base and the internal one of said rearward strut of said second strut assembly being pivotally connected to said second side girder of said base at a position spaced away from said first end of said second side girder such that the forward strut and rearward strut of the second strut assembly move parallel with each other, said rearward struts of said first and second strut assemblies being connected together only at upper ends thereof, at least one pivotally fixed transverse support, each pivotally connected at opposite ends to one said forward strut and associated rearward strut, and being adapted to engage said at least one platform such that telescopic adjustment of said rearward struts of said first and second strut assemblies provides a coordinated adjustment of an angle of inclination of said at least one platform, wherein said angle of inclination can be maintained substantially as the framework is pivoted relative to said base, and a stay pivotally connected at upper portions of the forward struts and selectively positionable in respective ones of said grooves for retaining the framework in any one of a plurality of available angled positions relative to the base.

2. An adjustable stand assembly according to claim 1, further comprising a rigid spacer bridging respective external ones of said rearward struts of said strut assemblies to connect together said rearward struts at the upper ends thereof and to hold said strut assemblies in substantially parallel, spaced apart relationship.

3. An adjustable stand assembly according to claim 2, wherein the pivotal connection of each said forward strut is fixed to a respective said side girder of said base at a fixed pivot, and the pivotal connection of each said rearward strut to said base is via an elongated slot in said respective side girder of said base, said slot being positioned lower than said fixed pivot so as to allow said framework to fold down substantially coplanar to said base.

4. An adjustable stand assembly according to claim 3, wherein at least one said rearward strut includes a locking device to allow said telescopic adjustment to be fixed at a selection of positions.

5. An adjustable stand assembly according to claim 2, wherein at least one said rearward strut includes a locking device to allow said telescopic adjustment to be fixed at a selection of positions.

6. An adjustable stand assembly according to claim 1, wherein at least one said rearward strut includes a locking device to allow said telescopic adjustment to be fixed at a selection of positions.

7. An adjustable stand assembly according to claim 1, wherein the pivotal connection of each said forward strut is fixed to a respective said side girder of said base at a fixed pivot, and the pivotal connection of each said rearward strut to said base is via an elongated slot in said respective side girder of said base, said slot being positioned lower than said fixed pivot so as to allow said framework to fold down substantially coplanar to said base.

8. An adjustable stand assembly according to claim 7, wherein at least one said rearward strut includes a locking device to allow said telescopic adjustment to be fixed at a selection of positions.

* * * * *